July 8, 1958 M. LILIENSTEIN 2,842,733

FUNCTION GENERATOR

Filed Nov. 1, 1954

INVENTOR
MANFRED LILIENSTEIN
BY Philip M. Bolton
ATTORNEY

United States Patent Office 2,842,733

Patented July 8, 1958

2,842,733

FUNCTION GENERATOR

Manfred Lilienstein, Paramus, N. J., assignor to International Telephone and Telegraph Corporation, New York, N. Y., a corporation of Maryland

Application November 1, 1954, Serial No. 466,009

3 Claims. (Cl. 323—66)

This invention relates to a circuit for generating energy of a desired function from a variable voltage, and particularly to such a circuit which comprises static impedance components exclusively.

Circuits which are utilized for generating energy of a desired function, hereinafter called function generators, have found utility in the computer field, particularly computers of the analog type. The function generator is generally equipped to convert an applied voltage to a desired function of that voltage. For example, function generators are known which are capable of converting an applied voltage into a logarithmic function, exponential function, anti-logarithmic function, trigonometric function and other functions useful in the computer field.

One function generator which is typical of conventional function generators utilizes a plurality of parallel-connected diodes to convert one waveform into another waveform of a given function. In this type of function generator, adjustable biasing voltages are used to control the operation of the diodes and therefore, the diodes are sensitive to supply voltage variations. This represents a shortcoming which would apply to any type generator which employs electron discharge devices such as vacuum or gas discharge tubes.

Accordingly, it is an object of this invention to provide a function generator which employs static electrical impedance components exclusively and therefore requires no biasing voltages.

It is a feature of this invention to provide a function generator which employs no moving parts which are susceptible to mechanical failure.

In accordance with an aspect of this invention, there is provided a circuit for generating energy of a desired function from an applied variable voltage. The circuit comprises a plurality of parallel connected arms, each of which includes static electrical impedance components exclusively. The effective impedance of each arm is different so that the arms conduct current in response to correspondingly different values of applied voltage. The arms are adapted to conduct current successively so that a cumulative current, when more than one arm is conducting, is obtained at the output of the circuit. Thus, by varying the amplitude of the applied voltage over a given range, the arms are made to conduct current individually and cumulatively so that the current at the output of the circuit describes the desired function.

Figure 1:
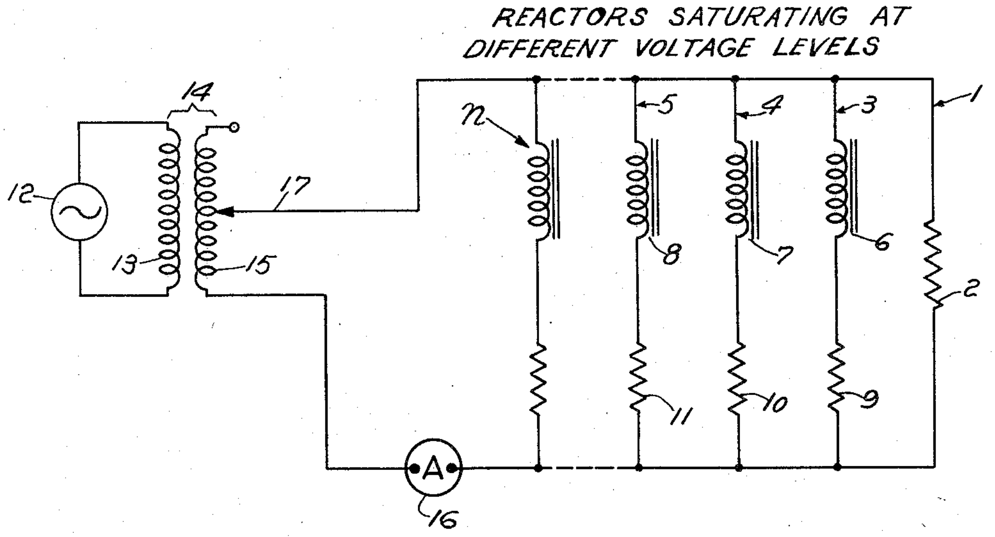
Figure 2:
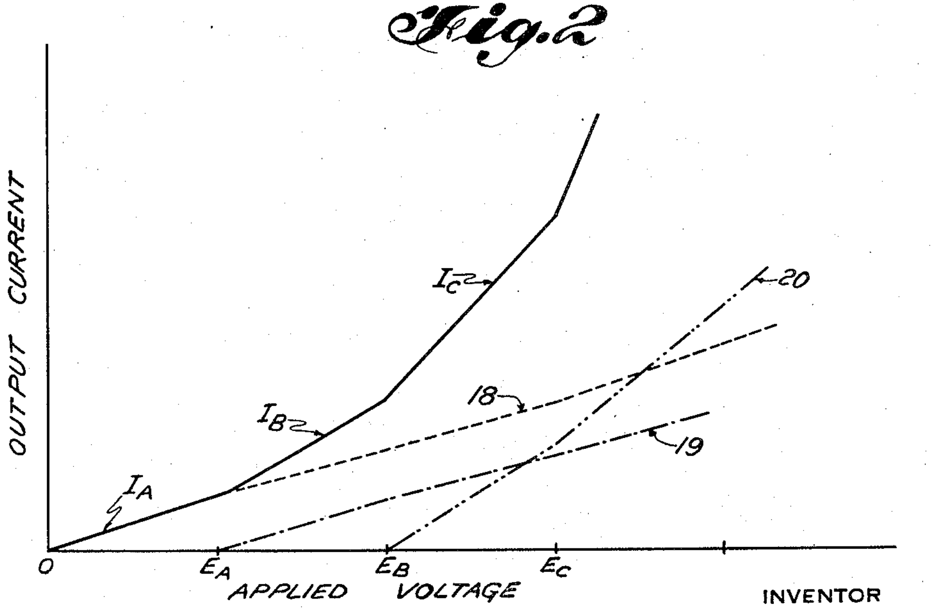

The above-mentioned and other features and objects of this invention and the manner of attaining them will become more apparent and the invention itself will be best understood by reference to the following description of an embodiment of the invention, taken in conjunction with the accompanying drawings, wherein:

Fig. 1 is a schematic diagram of a preferred embodiment of the function generator; and Fig. 2 is a curve representing the desired function obtained at the output of the generator.

Referring now to Fig. 1, there is shown a function generator comprising a plurality of arms connected in parallel. A first arm 1, preferably contains simply a resistor 2. The remaining arms as illustrated, namely 3, 4 and 5 contain respectively coils 6, 7 and 8 wound on magnetic cores preferably of high permeability and connected in series with a resistor 9, 10 and 11. The generator may comprise a greater number of arms depending on the function to be produced and therefore, the last arm is designated as "*n*." The effective impedance of each arm is different from the impedance of the other arms, and preferably, the effective impedance increases gradually from arm 1 towards arm *n*. If desired, two arms may contain the stame components so that the flow of current is divided therebetween and thus, the wattage ratings of the components required for the two arms is correspondingly lowered. However, this is simply a matter of design and the term "arm" as used in the specification and claims, is interpreted to mean one of the several arms which is capable of conducting at one particular value of applied voltage.

A variable voltage is applied to the function generator by means of an alternating-current generator 12, coupled to a primary 13 of a variable transformer 14. The secondary 15 of the transformer 14 has one terminal coupled to a current utility or current measuring device such as an ammeter 16. The other terminal of the secondary 15 is effectively a variable tap 17 which is adjustable to apply varying voltages across the parallel arms.

The coils 6 to "*n*" may each be wound on magnetic cores of the same dimension with a single wire but differ from one another by the number of turns wound about each core. Accordingly, the cores saturate at different voltages.

It is known that when a varying voltage is applied to a winding surrounding a magnetic core of high permeability material, practically no current is conducted through the winding until the core is saturated. Theoretically, if the circuit had no resistance, then, increasing the voltage after the core were saturated would cause the current to go to infinity. The present invention utilizes this principle to obtain the desired function. Referring now to Figs. 1 and 2, as the applied voltage is increased from zero to $E_a$ by moving the tap 17 along the secondary winding 15, a current $I_a$ is conducted through the arm 1. For this value of voltage, the resistor 2 determines the amount of current conducted through the arm 1. In the absence of the other parallel arms, the current $I_a$ would increase linearly with the applied voltage as shown by the dotted line 18. At the voltage $E_a$, the core of coil 6 is approximately saturated and therefore, any increase in voltage causes arm 3 to conduct current; increase in the current as a function of input voltage conducted by this arm is determined by the value of resistor 9. Thus, by increasing the applied voltage from $E_a$ to $E_b$, a current $I_b$ is obtained at the output as indicated in the ammeter 16 which is a cumulation of the current conducted through the arms 1 and 3. The dotted line 19 indicates the flow of current in the arm 3 in the absence of the other arms. At the voltage $E_b$, the core of coil 7 is approximately saturated and therefore, an increase in the applied voltage causes this arm to conduct current. Thus, by increasing the current from $E_b$ to $E_c$, a current $I_c$ is obtained in the output which is a cumulation of the currents through the arms 1, 3 and 4. The dotted line indicated at 20 indicates the current which arm 4 would conduct in the absence of the other arms when the voltage applied has a value $E_b$. Similarly, the arms 5 to *n*, are made to conduct successively in dependence on the amplitude of the applied voltage, producing a cumulative current in the output of the generator.

The curve as illustrated in Fig. 2 is determined by the circuit parameters, namely the size of the cores, the number of turns and the values of the resistor placed in series with the respective core windings. The curve generated is substantially several straight lines and the degree to which a round curve is approximated depends on the number of arms in the circuit.

Although the applied voltage is shown as derived from a variable transformer, it is to be realized that the voltage may be obtained from any other suitable source.

Experiment has shown that in order to generate ¼ circle and having a tolerance of ¾ of 1%, 5 arms in the generator would be required.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. A circuit for generating energy of a desired function from an applied variable voltage source, comprising a plurality of parallel connected arms, each of said arms including a saturable core reactor, the reactors in the different arms being adapted to saturate at different voltage levels, the current through said arms being limited essentially by the reactances of said saturable core reactors before saturation thereof, means for applying a variable alternating voltage to said parallel connected arms, and a common output circuit coupled to a terminal of each of said arms for receiving the cumulative current therefrom.

2. The circuit according to claim 1 wherein each of said arms comprises a resistor with said saturable core reactor, and further comprising an additional arm connected in parallel to said plurality of arms comprising only a resistor.

3. A circuit for generating energy representing a desired function of an applied variable voltage source comprising a plurality of parallel connected arms, means for applying the voltage to said arms to produce an initial current therethrough, one of said arms comprising a resistor, each of the remaining of said arms consisting solely of a wound core and a resistor connected in series, the turns about each core being different for the respective arms, producing a current increase at a predetermined rate with increase in voltage before saturation of said coils occurs, whereby the wound cores saturate at different applied voltage levels producing an increase in said rate with further increase in applied voltage and a common output connection for said arms.

References Cited in the file of this patent

UNITED STATES PATENTS

| | | |
|---|---|---|
| 1,921,788 | Suits | Aug. 8, 1933 |
| 2,697,201 | Harder | Dec. 14, 1954 |